United States Patent [19]

Nishibori

[11] Patent Number: 5,785,259
[45] Date of Patent: Jul. 28, 1998

[54] PROCESS FOR REGENERATING LAMINATED THERMOPLASTIC MOLDED RESIN ARTICLES AND APPARATUS FOR REGENERATING THE SAME

[75] Inventor: Sadao Nishibori, Tokyo, Japan

[73] Assignee: EIN Engineering Co., Ltd., Tokyo, Japan

[21] Appl. No.: 715,816

[22] Filed: Sep. 19, 1996

[30] Foreign Application Priority Data

Mar. 18, 1996 [JP] Japan ................................. 8-061305

[51] Int. Cl.⁶ ........................................................ B02C 19/12
[52] U.S. Cl. .............................. 241/24.18; 241/24.28; 241/29; 241/79.1; 241/79.2; 241/152.2; 241/188.2; 241/DIG. 38
[58] Field of Search .......................... 241/24.18, 24.28, 241/27, 29, 74, 77, 79.1, 79.2, 188.2, 152.2, DIG. 38

[56] References Cited

U.S. PATENT DOCUMENTS

| | | | |
|---|---|---|---|
| 669,188 | 3/1901 | Stonebraker | 241/79.2 X |
| 2,189,711 | 2/1940 | Eigenbrot | 241/77 X |
| 4,065,060 | 12/1977 | Booz | 241/79.2 X |
| 4,483,488 | 11/1984 | Luff et al. | 241/24.18 X |
| 4,648,560 | 3/1987 | Rolle et al. | 241/77 X |
| 4,747,547 | 5/1988 | Harada | 241/29 X |
| 4,964,577 | 10/1990 | Kopp | 241/24.18 X |
| 5,301,881 | 4/1994 | Hayashi et al. | 241/24.18 X |
| 5,323,971 | 6/1994 | Nishibori et al. | 241/3 |
| 5,524,838 | 6/1996 | Ellers et al. | 241/29 X |
| 5,535,945 | 7/1996 | Sferrazza et al. | 241/DIG. 38 |
| 5,566,888 | 10/1996 | Yamamoto | 241/24.28 X |

FOREIGN PATENT DOCUMENTS

| | | | |
|---|---|---|---|
| 0 614 701 | 9/1994 | European Pat. Off. | 241/152.2 |
| 53-27165 | 3/1978 | Japan | 241/24.18 |
| 53-88978 | 8/1978 | Japan | 241/24.18 |
| 6-134759 | 5/1994 | Japan | 241/24.18 |
| 6-134759 A | 5/1994 | Japan . | |
| 06298979 A | 10/1994 | Japan . | |
| 07164444 A | 6/1995 | Japan . | |
| 07266313 A | 10/1995 | Japan . | |
| 08103934 A | 4/1996 | Japan . | |
| 08118452 A | 5/1996 | Japan . | |
| 08155925 A | 6/1996 | Japan . | |
| 08164551 A | 6/1996 | Japan . | |

*Primary Examiner*—John M. Husar
*Attorney, Agent, or Firm*—Millen, White, Zelano, & Branigan, P.C.

[57] ABSTRACT

The present invention is intended to, from thermoplastic molded resin articles composed by a variety of laminating thermoplastic resin materials, separate, classify, select and recover the thermoplastic resin materials with classification in terms of type for reusing these materials. The process of the present invention comprises at least a step where laminated molded articles comprised by a variety of laminating thermoplastic resin materials are coarsely crushed into a plurality of small pieces to be treated; a step where impact type frictional crushing force is applied to said coarsely crushed small pieces 82 to be treated so that the above-mentioned small pieces 82 to be treated are peeled or separated, granulated or size-regulated, or pulverized with classification in terms of type; and a step where the resultant granulated or size-regulated particle-form thermoplastic resin materials 83 are selected so as to be particle-form thermoplastic resin materials 83a, 83b with classification in terms of type by means of rolling selecting or this rolling selecting and gravity selecting.

15 Claims, 9 Drawing Sheets

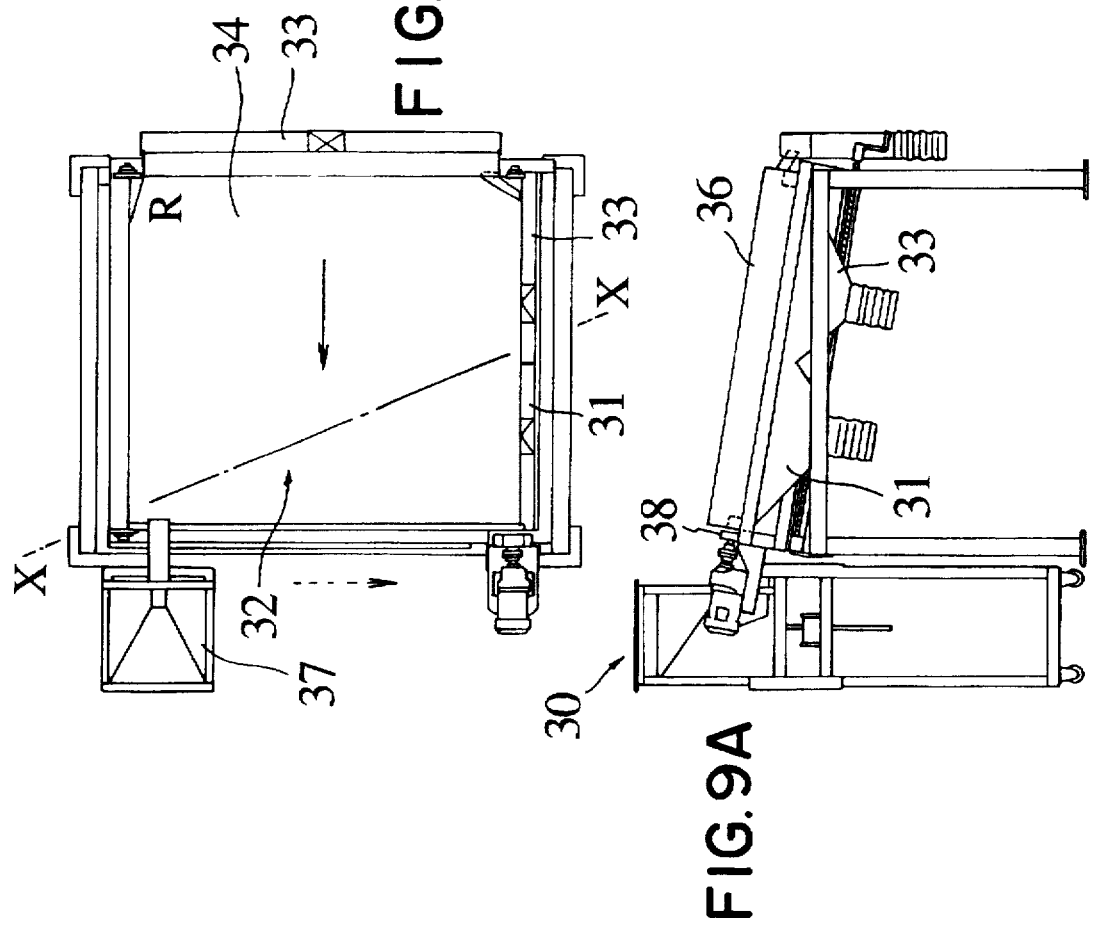

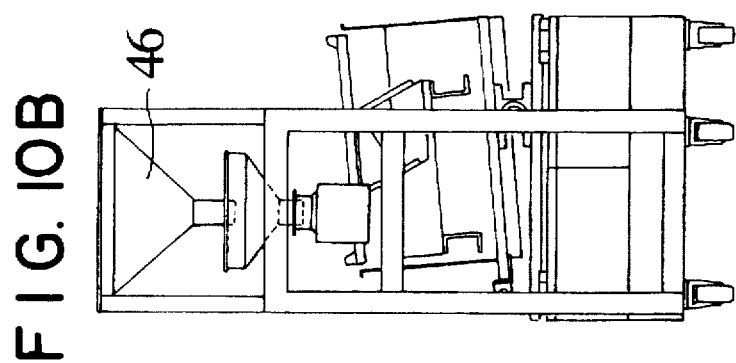
FIG.10B
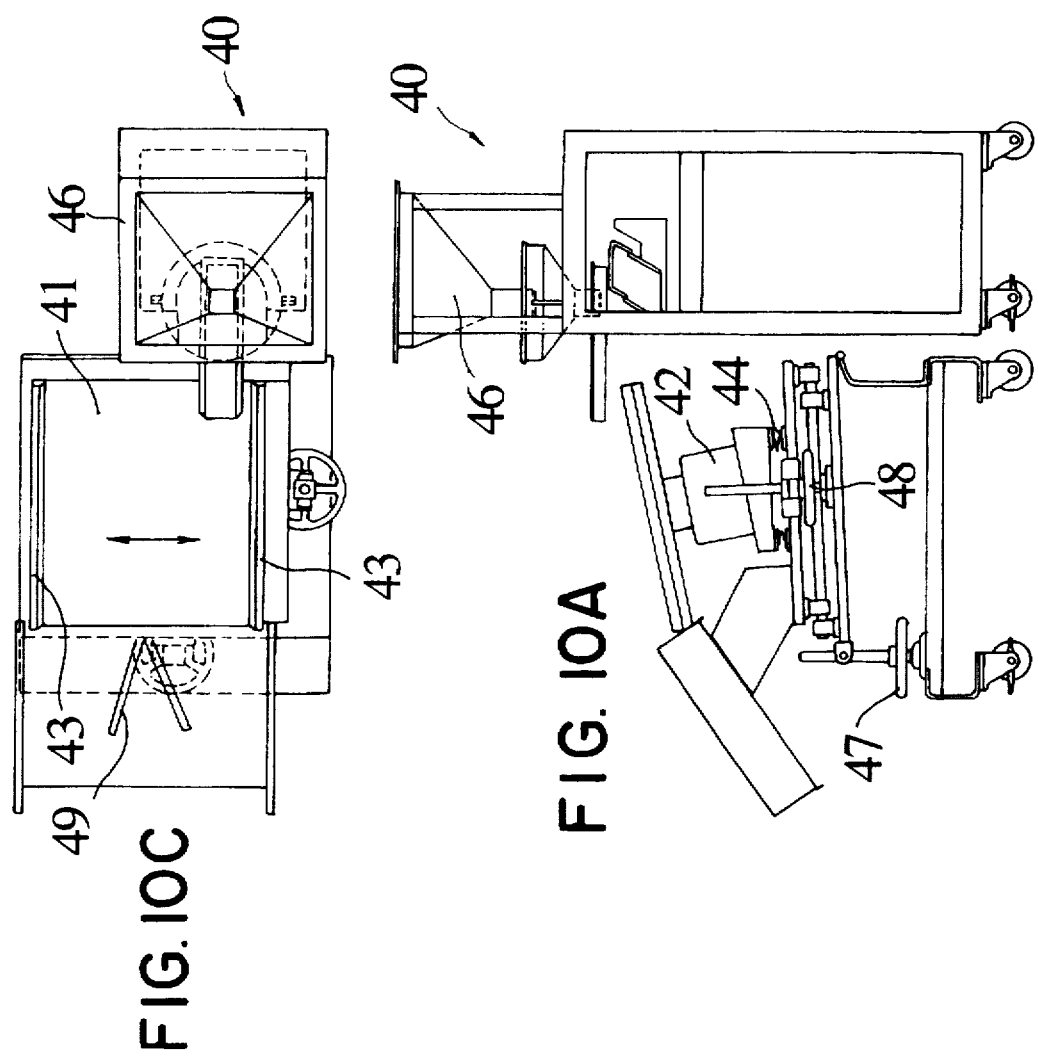
FIG.10C
FIG.10A

PROCESS FOR REGENERATING LAMINATED THERMOPLASTIC MOLDED RESIN ARTICLES AND APPARATUS FOR REGENERATING THE SAME

BACKGROUND OF THE INVENTION

1. Field of the Invention

This invention relates to a process and an apparatus for regenerating thermoplastic molded resin articles used as laminated thermoplastic molded resin articles. The present invention relates more specifically to a process, for laminated thermoplastic molded resin articles to be treated, such as car's instrument panel, seat, door trim, console box, bumper and the like, each of which is formed so as to have a multi-layer structure by integrating on their surfaces a variety of thermoplastic resin materials through cushion layers or primer layers for decorating and/or protecting purposes by means of lamination, adhesion and the like. Then, in the process, the disposed thermoplastic molded resin articles mentioned just above are crushed into a plurality of small pieces to be treated so that peeling, separating, granulation, and classifying can be carried out for the variety of thermoplastic resin materials contained in the above mentioned treated small pieces in order to recover the resin materials with classification in terms of type. Further, the present invention relates to an apparatus for conducting this process.

2. Description of the Prior Art

Thermoplastic resin articles are now used in many applications in large amounts as car's inner and outer equipment in order to decrease car-weight and because of their molding with easiness. However, since thermoplastic molded resin articles (that may also hereinafter be referred to as the "molded article") will yearly be exhausted, its reuse is now demanded intensively in society.

Conventionally, in the recovering and reuse of the molded articles, the thermoplastic resin materials (those may also hereinafter be referred to as the "resin materials") were usually sorted so that each group of resin materials had the same type and properties, for the intention of regeneration and reuse of the resin materials with classification in terms of type.

As the above-mentioned molded articles, particularly the molded articles used in the car's inner and outer equipment such as bumper, instrument panel (that may also hereinafter be referred to as the "panel") and the like, there are a large number of molded articles each of which is laminated with a variety of resin materials such as sheet, film and the like so as to have the multi-layer structure for many purposes such as facial decoration, protection, and the like. However, in each molded article, it is very difficult to peel off adhesive or primer and to sort the resin materials composing this molded article with classification in terms of type. Additionally, when such resin articles are recovered as they are, regeneration is carried out while a variety of laminating thermoplastic resin materials (those may also hereinafter be referred to as the "laminating materials") are mixed, resulting in that not only are molded articles regenerated much inferior in mechanical property such as impact strength, but any surface smoothness and color cannot be obtained as desired as well. Thus, its reuse is limited.

The present inventors already disclosed in U.S. Pat. No. 5,323,971, a pulverizing and separating process where pulverizing, separating and size-regulating process where from the substrate material layer of a disposed molded resin article, a resin film or layer formed on its surface is separated and removed thereby resin materials in raw-form can be recovered and if desired, resin materials each of which is size-regulated to have the particle diameter within the predetermined range can be recovered.

SUMMARY OF THE INVENTION

The present invention is attained by the inventors paying attention to the fact obtained from the results of experiments that when impact type frictional crushing force is applied to a plurality of small pieces to be treated which have been obtained by crushing or coarsely crushing thermoplastic molded resin articles comprised by a variety of laminating materials, by synergism of generation of frictional heat due to this impact type frictional crushing force and frictional crushing action, thermoplastic resin materials composing the above-mentioned molded articles are granulated with classification in terms of type so as to have different situations of particles (that may also hereinafter be referred to as the "particle-situations") determined by mainly their softening points, and are granulated so that their particle-situations become flake or spherical situations, causing differences in particle-situation or specific gravity or differences in particle-situation and specific gravity, thereby a variety of thermoplastic resin materials can be peeled, separated and classified with classification in terms of type according to such difference. The present invention has for its object to provide a process where a variety of laminating materials of car's panel and the like, in other words, thermoplastic resin materials composing each layer of a laminated thermoplastic molded resin article and the like having the multi-layer structure are in a relatively simple way, peeled or separated, granulated, and classified in this layer, that is with classification in terms of type, thereby resin materials in raw-form can be recovered with classification in terms of type. Further the present invention has for its object to provide an apparatus for conducting this process.

In order to attain the above-mentioned objects, in the present invention, the regenerating process, for laminated thermoplastic molded resin articles (those may also hereinafter be referred to as the "laminated molded articles") to be treated which are applied to for example car's inner and outer equipment, comprises at least, a step where the above laminated molded articles are coarsely crushed into a plurality of small pieces; a step where impact type frictional crushing force is applied to the above-mentioned coarsely crushed small pieces so that thermoplastic resin materials are peeled or separated with classification in terms of type from the above-mentioned treated small pieces and the resultant materials are granulated or size-regulated to be particle-form thermoplastic resin materials (those may also hereinafter be referred as the "particle-form materials"); and a step where the above-mentioned particle-form materials are selected with classification in terms of specific gravity or specific gravity and particle-situation (shape of particle) of the resin materials composing each particle-form material so as to be sorted with classification in terms of type according to this selecting action, and the particle-form materials in raw-form are recovered.

The above-mentioned particle-form materials can be selected in rolling selecting and in gravity selecting with classification in terms of difference in specific gravity of particle-form material. It is preferable that the rolling selecting step where the above-mentioned particle-form materials are selected with classification in terms of particle-situation is carried out after a screening step.

It is preferable that after the particle-form materials are subjected to the above-mentioned rolling selecting step, a mixture of the plurality types of particle-form materials having a variety of particle-situations is further subjected to the gravity selecting step where the materials are selected with classification in terms of difference in specific gravity.

Further, in the present invention, the apparatus for regenerating the laminated thermoplastic molded resin materials, for the molded resin articles comprised by a variety of laminating materials to be treated, for example for the molded articles applied to car's inner and outer equipment, comprises at least, coarsely crushing means, by which the molded articles are coarsely crushed into a plurality of small pieces 82 to be treated;

separating, granulating, and classifying means by which, between a series of fixed pins 134 and a series of movable pins 144 which are rotated relatively in a plurality of rotational orbits, respectively, being different from each other, thermoplastic resin materials composing the above-mentioned small pieces 82 to be treated are peeled or separated with classification in terms of type, as well as granulated or size-regulated alternatively size-regulated and pulverized so that the resultant granulated or size-regulated, alternatively size-regulated and pulverized thermoplastic resin materials can be classified; and selecting means by which the above-mentioned particle-form materials 83, which have been granulated or size-regulated by the above-mentioned separating, granulating, and classifying means, are selected with classification in terms of specific gravity and/or particle-situation so that the particle-form materials in raw-form are recovered with classification in terms of type according to this selecting action.

As for the above-mentioned selecting means, rolling selecting means by which the particle-form materials 83 are selected according to their particle-situation can be applied. Alternatively, the rolling selecting means as well as gravity selecting means by which the particle-form materials 83 are selected according to the difference in specific gravity can be applied continuously.

BRIEF DESCRIPTION OF THE DRAWINGS

The object and advantages of the invention will become understood from the following detailed description of preferred embodiments thereof in connection with the accompanying drawings in which like numerals designate like elements, and in which:

FIG. 9 is a front view (A), right-side view (B), and plan view (C) of a rolling selector as one selecting means used in the rolling selecting step in the selecting step of the present invention;

FIG. 10 is front view (A), right-side view (B), and plan view (C) of a vibration selector as another selecting means used in the rolling selecting step in the selecting step of the present invention.

DETAILED DESCRIPTION OF THE PREFERRED EMBODIMENT

Disposed thermoplastic molded resin article to be treated

The disposed thermoplastic molded resin articles to be treated (those may also hereinafter be referred as the "disposed molded articles") are molded articles comprising different kinds of resin materials such as polyethylene (PE), polyester (PET), polyvinylchloride (PVC), polypropylene (PP), ABS and the like and a foamed structure of PP, polyurethane (PUR), polystyrene, vinylchloride, PE and the like, particularly laminated molded articles each of which is formed with a plurality of resin materials so as to have a multi-layer structure. As concrete examples, there are car's instrument panel, seat, door trim, console box, glove compartment, gasoline tank, bumper, and sheet material such as car's floor carpet, floor sheet material, sheet material of seat, sheet material of door's lining, cover material of arm rest, cover material of head rest and the like. Such sheet materials are applied to the car's floor, seat, door, arm rest, head rest and the like. These laminated molded articles are to be treated.

The resin materials composing molded articles serving as the above-mentioned laminated molded articles such as car's panel, car-seat, door trim, console box, bumper and the like includes, but not limited to, materials shown in the following table.

TABLE 1

| thermoplastic molded resin article | Resin materials composing laminated molded articles applied to car's inner and outer equipment | | |
|---|---|---|---|
| | surface layer | intermediate layer | substrate material layer |
| panel | PVC | foamed structure of PUR or PP | PP or ABS |
| seat | PVC | foamed structure of PUR | foamed structure of PUR |
| door trim | PVC or PET | foamed structure of PP or PUR | PP, ABS |
| console box | PP | | PP, ABS |
| bumper | PP | | PP, ABS |
| gasoline tank | PE | EVOH | PE |

Figure 1:
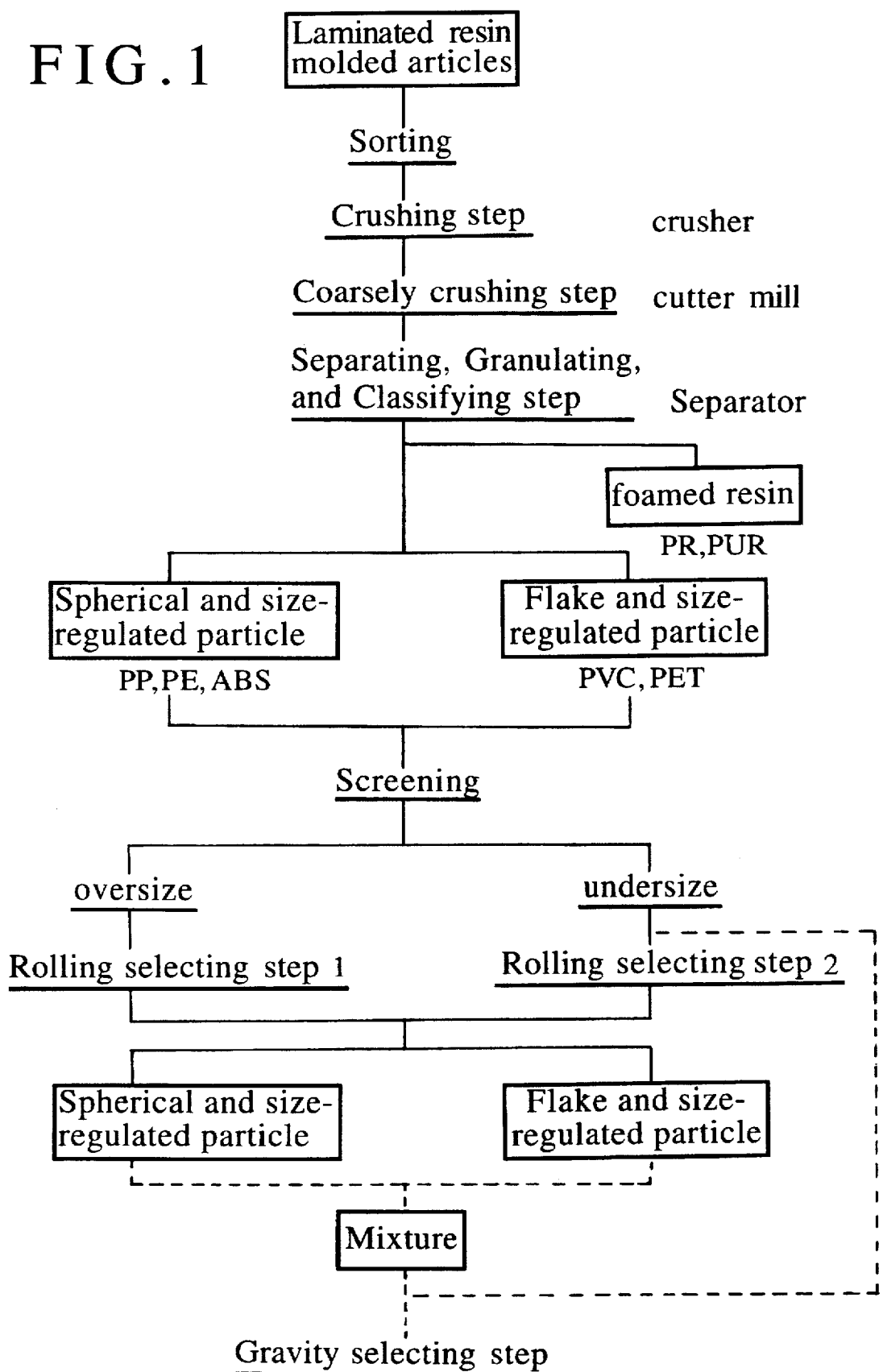
FIG. 1 is a flow diagram that provides the general aspect of steps of regenerating process of the present invention for disposed thermoplastic molded resin articles.

Now, is explained the process where from the molded articles formed so as to have the above-mentioned multi-layer structures, different kinds of thermoplastic resin materials such as PE, PET, PVC, PP, ABS, foamed structure of PP or PUR and the like are separated each other, granulated and classified for recovering. The process comprises a sorting step where recovered disposed molded articles are sorted with classification in terms of type, color and the like; crushing, coarsely crushing step where the above-mentioned sorted disposed molded articles are crushed into small pieces 82 to be treated; separating, granulating and classifying step where from the above-mentioned small pieces 82 to be treated, a variety of thermoplastic resin materials are peeled or separated and granulated or size-regulated with classification in terms of type as well as foamed resin and other impurities such as dust and scrap are classified so that the resultant resin materials are recovered; a screening step; and a selecting step, for instance rolling selecting steps 1, 2 where the particle-form material 83, which are granulated or simultaneously size-regulated upon the granulating action, are selected with classification in terms of type based on the property showing difference in friction resistance according to the particle-situation, alternatively gravity selecting step where the above-mentioned granulated or size-regulated particle-form materials 83 are selected with classification in terms of specific gravity added to the above-mentioned rolling selecting steps 1, 2 (See FIG. 1). An important combination of materials which is not described in Table 1 is surface layer: PVC, intermediate layer: foamed structure of PE, and substrate material layer: PP.

Sorting step

This is an accompanying step adapted as desired. In this sorting step, recovered disposed molded articles are sorted with classification whether they are colored or not or what color they are.

The disposed molded articles are sorted with classification whether they are colored or not and the like in order to prevent the situation where obtained thermoplastic resin materials are colored with undesirable color due to mixture of a variety of colors in recovered resin materials.

Additionally, in this sorting step, the disposed molded articles can be sorted with classification in terms of type or combination of resin materials composing the molded articles. By such sorting action, resin materials which can not be selected easily are contaminated in the other resin materials in the rolling selecting step explained closely below. In this case, the gravity selecting step which will be also explained below can be omitted. Precisely, among the above-mentioned resin materials, due to the impact type frictional crushing force applied by a separator which will be explained below, resins such as PE, PP, ABS are granulated so as to have spherical shapes, on the other hand, resins such as PET, PVC are granulated so as to have flaky or flake shapes, further foamed structure of PP, PUR and the like are pulverized so as to have particle shapes. Hence, in this sorting step, for example, by only sorting the disposed molded articles with classification in terms of type so that simultaneously treated each group of thermoplastic resin materials composing the molded articles is only ABS, PVC or foamed structure respectively, the two kinds of thermoplastic resin materials, which can not be selected easily at the same time as explained just above, will be almost perfectly selected in the rolling selecting step explained below, thereby the additional gravity selecting step can be omitted.

Crushing step

Figure 7:
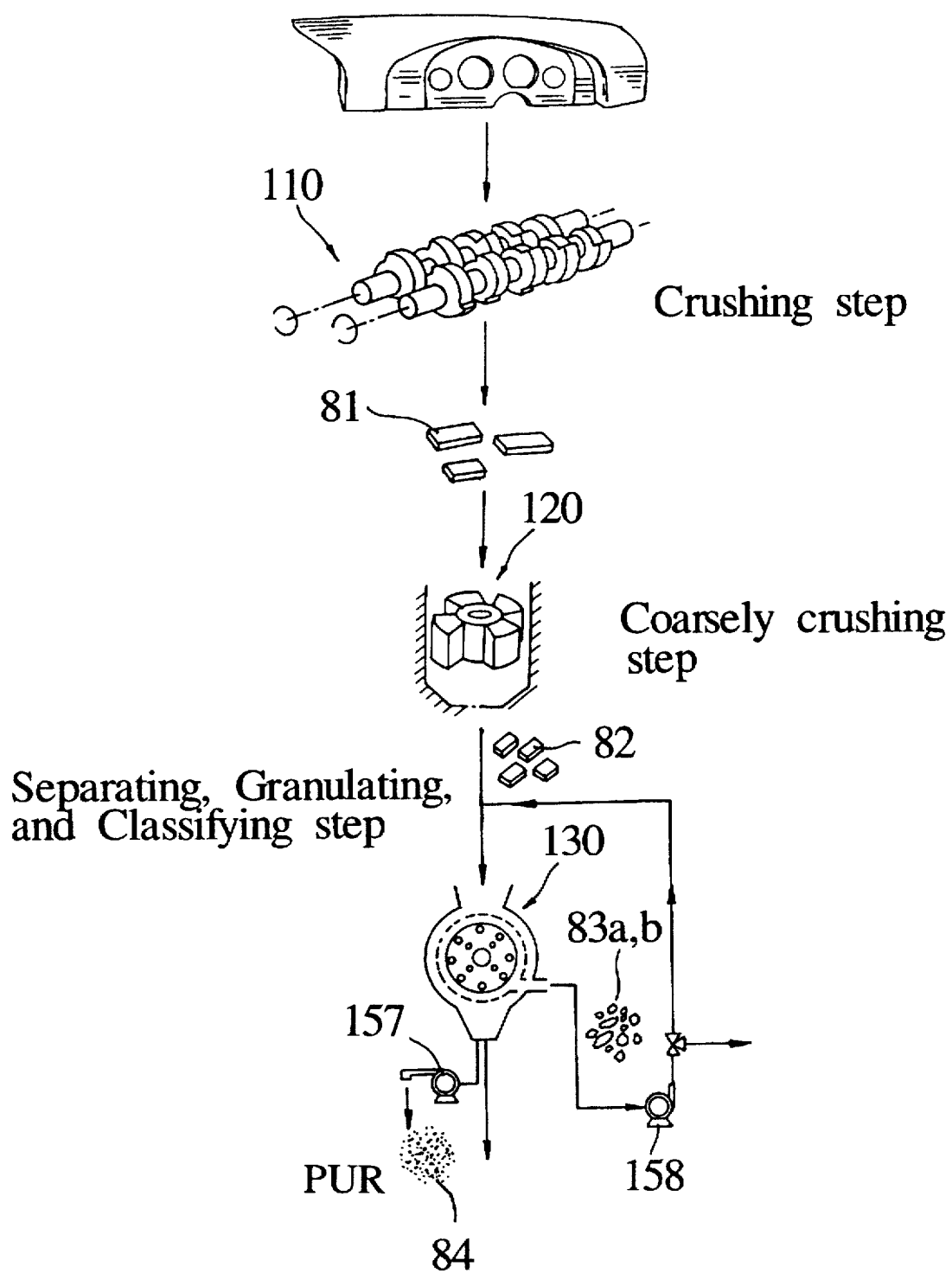
FIG. 7 is a process chart of the steps that provides a principal and schematic representation of the general aspect of the crushing step, coarsely crushing step, and separating, granulating and classifying step.

With the crushing means 110 as shown in FIG. 7, the recovered disposed molded articles are cut or crushed in a broader sense into crushed pieces 81 having suitable sizes, for example, about 150 mm×50 mm.

The crushing means is applied for forming the crushed pieces of suitable sizes by crushing the subject to be crushed. In this example, this means is called as "crusher" for convenience.

Figure 8:
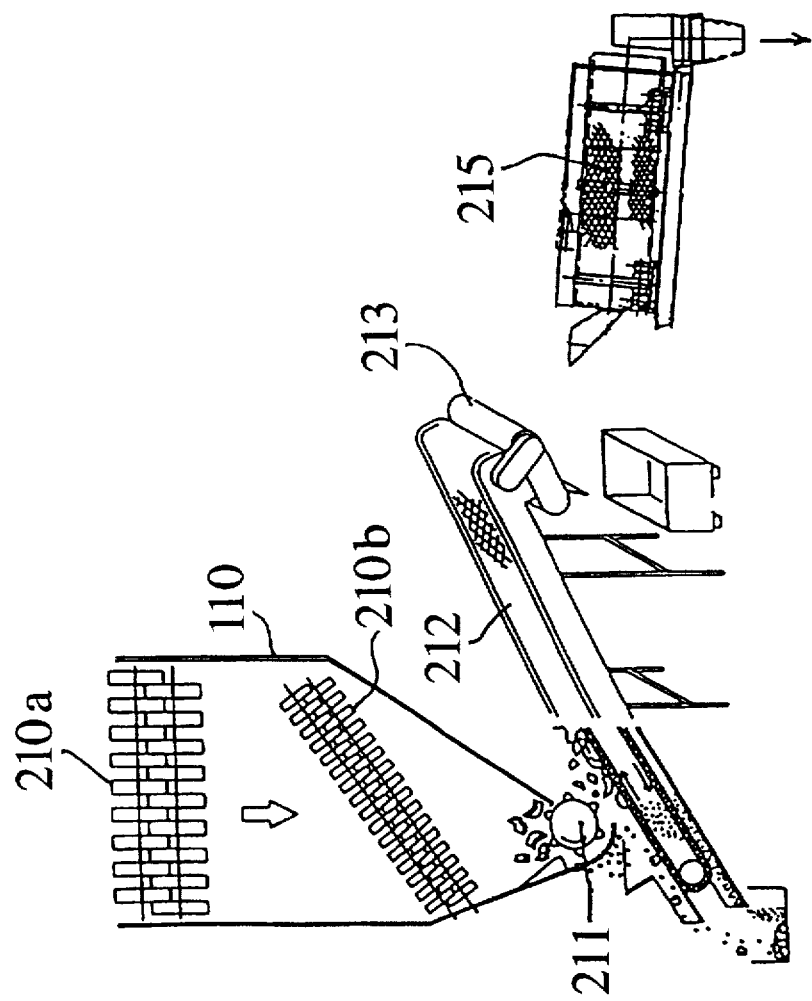
FIG. 8 is a longitudinally sectioned view that provides a schematic representation of the general aspect of the apparatus in another example in the crushing step.

One example of "crusher" is shown in FIGS. 7 and 8. The crusher 110 includes the crusher main body provided with, at its top, an inlet for substances to be crushed. In the crusher main body, there are a pair of shafts which are parallel and rotated inwardly so as to face each other. Then, a plurality of rotating blades are provided on each shaft so that they are spaced with predetermined distance. Three edges are provided so as to project from the external peripheral surface of each rotating blade of each shaft with the determined angle between the edge and the external peripheral surface of the rotating blade, thereby the edges of one shaft engage the corresponding edges of the other shaft. By this arrangement, the disposed molded articles are collected and cut into crushed pieces having suitable sizes.

By the two shafts which are rotated inwardly so as to face each other, the disposed molded articles fed through the upper inlet is introduced by the edges of the rotating blades of the two shafts. During rotation of each blade, since the edges on the external peripheral surface of the blade engage to other edges, the disposed molded articles which have been introduced between the edges are crushed and cut into crushed pieces 81, due to shear force which is activated continuously for slitting as well as compression force which is activated during introducing. These crushed pieces 81 are discharged through the discharge port provided below the above-mentioned rotating blades of the two shafts.

The crushing means is not limited to the above-mentioned crusher. A variety of crusher means; mono cutter, shredder, crusher and the like such as Gynax Crusher by Horai Co., Roll Crusher by Nara Kikai Co. can be applied.

As shown in FIG. 8, in the crusher main body, two crushers 210a, 210b may be arranged so as to be located in upper and lower levels respectively, for two stages of the crushing action. The crusher 210a1s axis is arranged horizontally. On the other hand, the crusher 210b1s axis is inclined so as to have the angle of 45°. By this arrangement, throughput of the disposed articles can be increased greatly and process time can be decreased.

It is preferable that, the cracker 211 is provided at the lower part of the crusher main body in order to obtain the above-mentioned crushed pieces 81 by easy crushing of the coarsely crushed disposed molded articles and in order to remove easily gravel or sand attached to the disposed molded articles, for simple forming of the above-mentioned crushed pieces 81. Additionally, it is preferable that, below the cracker 211, the net conveyor 212 comprising a net belt is provided so as to incline in the vertical direction at the angle of about 45° for screening out the gravel and sand contaminated among the above-mentioned crushed pieces 81. More preferably, the magnetic force selector 213 is mounted on the under surface of the above-mentioned net conveyor 212 at its fore end portion on its proceeding direction for sorting and removing metal pieces and ferrous rust contaminated among the crushed pieces 81. Further, if desired, the crushed pieces 81, from which the metal pieces and ferrous rust are removed, are passed through the rotating screen 215 comprising a metal net for separating small gravel, sand, metal powder and the like.

Coarsely crushing step

Figure 2:
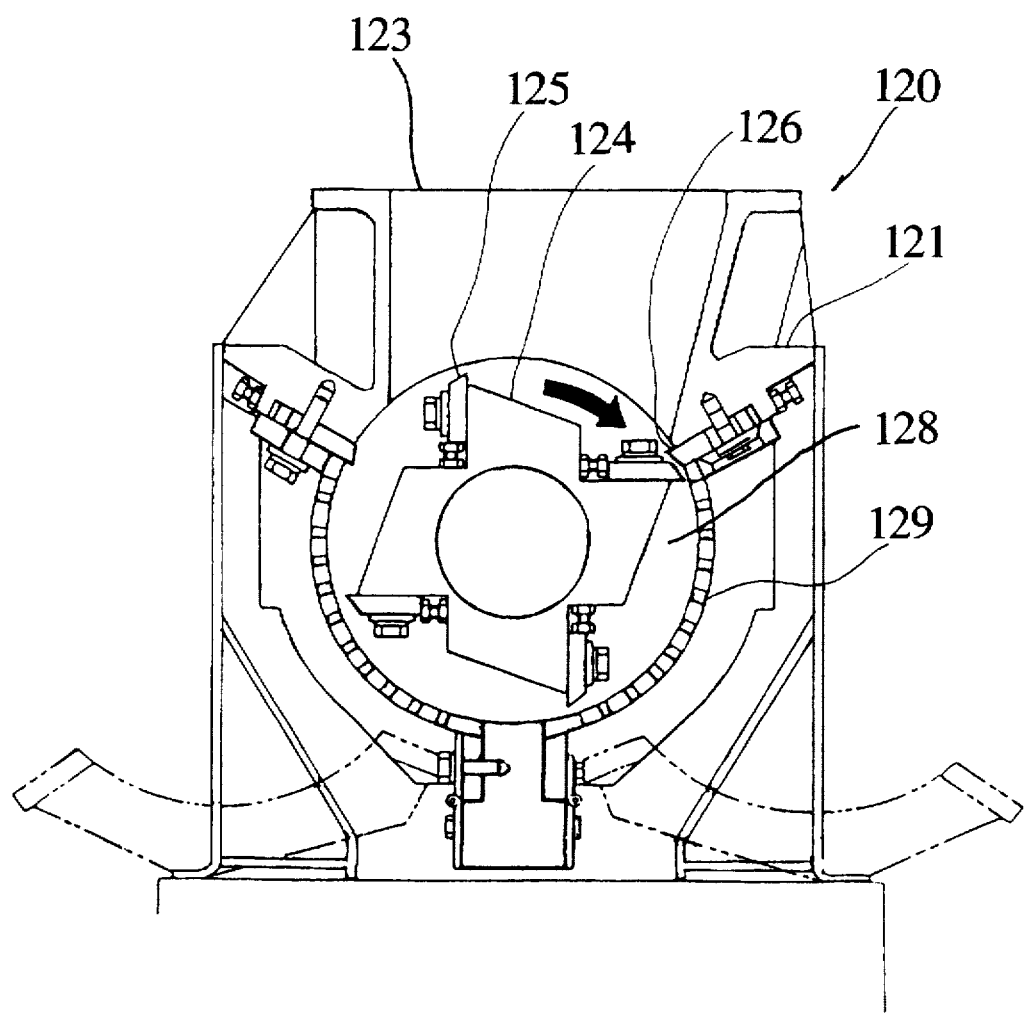
FIG. 2 is a fragmentary sectioned view that provides a representation of the main part of a cutter mill (crushing means) used in an example of the coarsely crushing step in the present invention.

With the coarsely crushing means shown in FIG. 2, the crushed pieces 81 obtained from the above-mentioned disposed molded articles are further finely cut, or crushed in a broader sense into small pieces 82 to be treated each having the diameter or side of under 5 mm, for example the rectangular shape of 4 mm×5 mm in size, square shape of 5 mm×5 mm in size and other undefined shapes of such sizes.

The coarsely crushing means is applied for cutting, coarsely crushing the crushed pieces 81 into small pieces 82 to be treated each having the suitable size. In this example, this means is called as "cutter mill" for convenience.

One example of coarsely crushing means, the cutter mill 120 is shown in FIG. 2. Reference numeral 121 designates the main body of the cutter mill and is a cylindrical shaped casing having the inlet opening at its top. The inlet opening is covered by the cover 122 which can be opened and closed optionally. This cover 122 is provided with the inlet port 123 for feeding the crushed pieces 81 to be coarsely-crushed into the cutter mill main body 121.

In the cutter mill main body 121, the cutter supporter 124 which is pivotably supported at the opposite side walls of the cutter mill main body 121 and rotated in the vertical direction with driving means to rotate, although not illustrated. On the external peripheral surface of the cutter supporter 124, four rotating blades 125 each of which is elongated horizontally. These four rotating blades 125 are arranged so that each blade forms the identical angle of 90° to the rotating direction of the cutter supporter 124 and four tip ends of the four rotating blades 125 are located on the same rotation orbit. Further, two fixed blades 126 are fixed on the cutter mill main body 121 at the substantially symmetrical points with respect to the orbit of the tip ends of the four rotating blades 125 with a small clearance with the orbit of the tip ends of the four rotating blades 125. By such arrangement, during the rotation of the rotating blades 125, the pieces to be coarsely crushed can be cut between rotating blades 125 and the fixed blades 126.

The clearance formed between the two fixed blades 126 and the rotating blades 125 can be optionally adjusted so that the pieces to be coarsely crushed can be cut into small pieces having desirable sizes. The clearance in this example is 0.2 to 0.3 mm. The periphery of the rotation orbit of the above-mentioned rotating blades 125, except a part corresponding to the inlet port 123, is surrounded with the mesh screen 129. The screen 129 is formed so that the pieces 82 to be treated each having the side of about 10 mm can be passed through the mesh. Further, outside of the above-mentioned screen 129, the screen receiver is provided so as to surround the screen 129 with a predetermined gap between the screen 129 and the screen receiver. Accordingly, the small pieces 82 to be treated which have been passed through the above-mentioned screen 129 are recovered so as to be contained in a space between the screen 129 and the screen receiver. Then, the screen receiver is configured so as to be opened and closed optionally for excharging of the small pieces 82 to be treated from the cutter mill main body 121 after passing through the screen 129.

The cutter mill 120 explained just above is used as follows. The above-mentioned pieces to be coarsely crushed are fed through the inlet port 123 and the cutter supporter 124 is rotated with the driving means to rotate, although not illustrated. Then, between the rotating blades 125 of the cutter supporter 124 and the fixed blades 126, the small pieces 82 to be treated pass through the screen 129. Thus, the small pieces 82 to be treated are obtained, although whose areas and shapes are not constant, but in many cases, each piece 82 has side or diameter of under about 5 mm, for example, the piece 82 has a rectangular shape of 4 mm×5 mm in size, square shape of 5 mm×5 mm in size, and the like. Continuously, these small pieces 82 are discharged through the discharge port to be transferred to the next step.

The coarsely crushing means is not limited to the above-mentioned cutter mill. For example, there is crushing means where a rotating shaft of each rotating blade 125 is provided so as to be elongated vertically and a screen 129 is provided between two fixed blades 126.

Separating, granulating and classifying step

In this step, impact type frictional crushing force is applied to the small pieces 82 to be treated which was obtained by crushing and coarsely crushing the disposed molded articles, thereby from the above-mentioned small pieces 82 to be treated, laminating materials serving as adhesive and construction elements are peeled and separated with classification in terms of type and the resultant separated thermoplastic resin materials are granulated or size-regulated, respectively. At the same time, if the disposed molded resin materials are composed by foamed resin layers of PP, PUR and the like, the foamed resin is finely ground so as to be peeled or separated from each small piece 82 to be treated, for recovering. By mixing with wood flour and the like, the recovered foamed resin is used as extender in molding plywood and the like. Further since the volume of the foamed resin can be decreased upon the above-mentioned finely grinding, it can be disposed or buried into the ground efficiently.

This step can be carried out repeatedly as desired.

The utilizing separating, granulating and classifying means is used for applying impact type frictional crushing force to the above-mentioned small pieces 82 to be treated which was obtained by crushing and coarsely crushing the above-mentioned disposed molded articles so that the above-mentioned small pieces 82 to be treated are frictionally crushed thereby the resin materials composing the molded articles are peeled or separated, granulated and classified with classification in terms of type and then the resin materials in the small pieces 82 to be treated are granulated or size-regulated. In this example, the means is called as "separator" for convenience.

As shown in FIGS. 3 to 6, in the separator 130, the inlet port 132 is opened and communicated with the center portion of the fixed disc 131 for feeding the small pieces 82 to be treated. Then, the fixed end disc 133 is provided so as to be faced to the fixed disc 131 and spaced from it with the gap of treating space 155. The external edge of the fixed end disc 133 is fixed to the above-mentioned fixed disc 131 at several points with peripheral side members 135. In the above-mentioned treating space 155, the movable disc 141 which is driven to rotate by means of the rotary shaft 142 is provided and the rotary shaft 142 is pivotably supported with the bearings 143, 143. The above-mentioned rotary shaft 142 is driven to rotate by driving means to rotate such as motor, although not illustrated.

Figure 6:
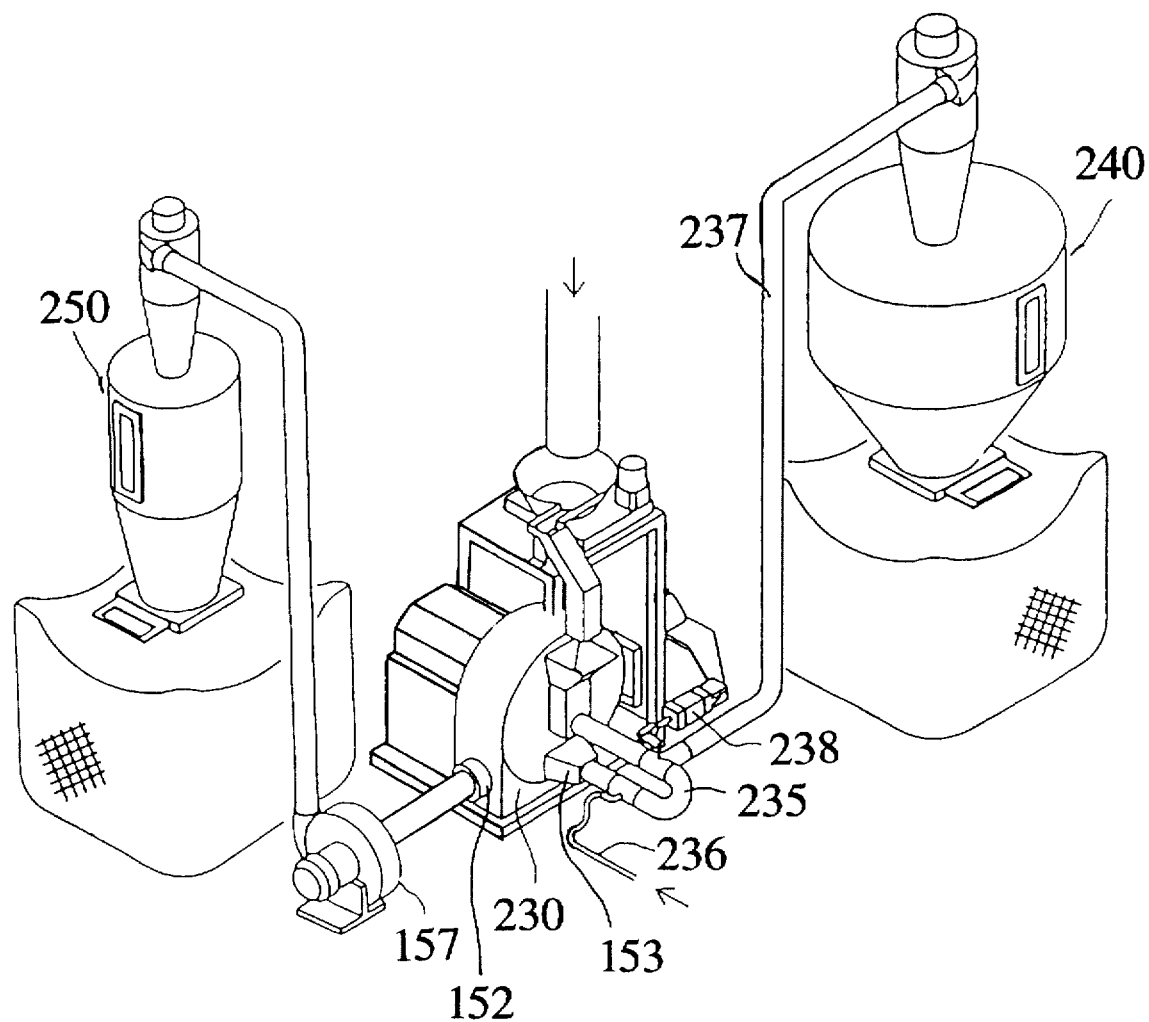
FIG. 6 is a view that provides a schematic representation of the application of an apparatus used in the separating, granulating, and classifying step in the present invention.

The above-mentioned fixed disc 131 is provided thereon with a plurality of, in this example six, concentric rotation orbits a (FIG. 5) of fixed pins 134 (with relativity to the movable disc 141). On the above-mentioned six concentric orbits which are located outwardly from the center to the external edge in the above-mentioned fixed disc 131, sixteen—twenty four—thirty two—thirty six—forty two—forty fixed pins 134 are set, respectively in this order. On the other hand, the above-mentioned movable disc 141 is provided thereon with a plurality of, in this example six, concentric rotation orbits b of movable pins 144 which are different from the above-mentioned fixed pins 134 and lie in alternate relation to the fixed pins 134. On the above-mentioned six concentric orbits which are located outwardly from the center to the external edge in the above-mentioned movable disc 141, four—four—four—four—four—six movable pins 144 are set, respectively in this order. Between these fixed and movable pins 134, 144, polishing, granulating or size-regulating, alternatively partially pulverizing actions can be obtained due to the impact type frictional crushing force. Further, at the external periphery-side of the movable disc 141 and inside of the above-mentioned peripheral side members 135, the screens 151 of given meshes, each of which is provided with pores of a desired diameter by punching, are provided so as to be peripherally located and spaced away from the peripheral side members 135 through the discharge space 156. Below the discharge space 156, the discharge port 152 is provided. As shown in FIG. 6, the blower 157 is communicated with the separator 130 through the above-mentioned discharge port 152. In this example, the above-mentioned screen 151 is the mesh with the diameter of 1 mm. The screen is normally the mesh with the diameter under 1.5 mm and preferably the mesh with the diameter of 0.8 mm.

Figure 3:
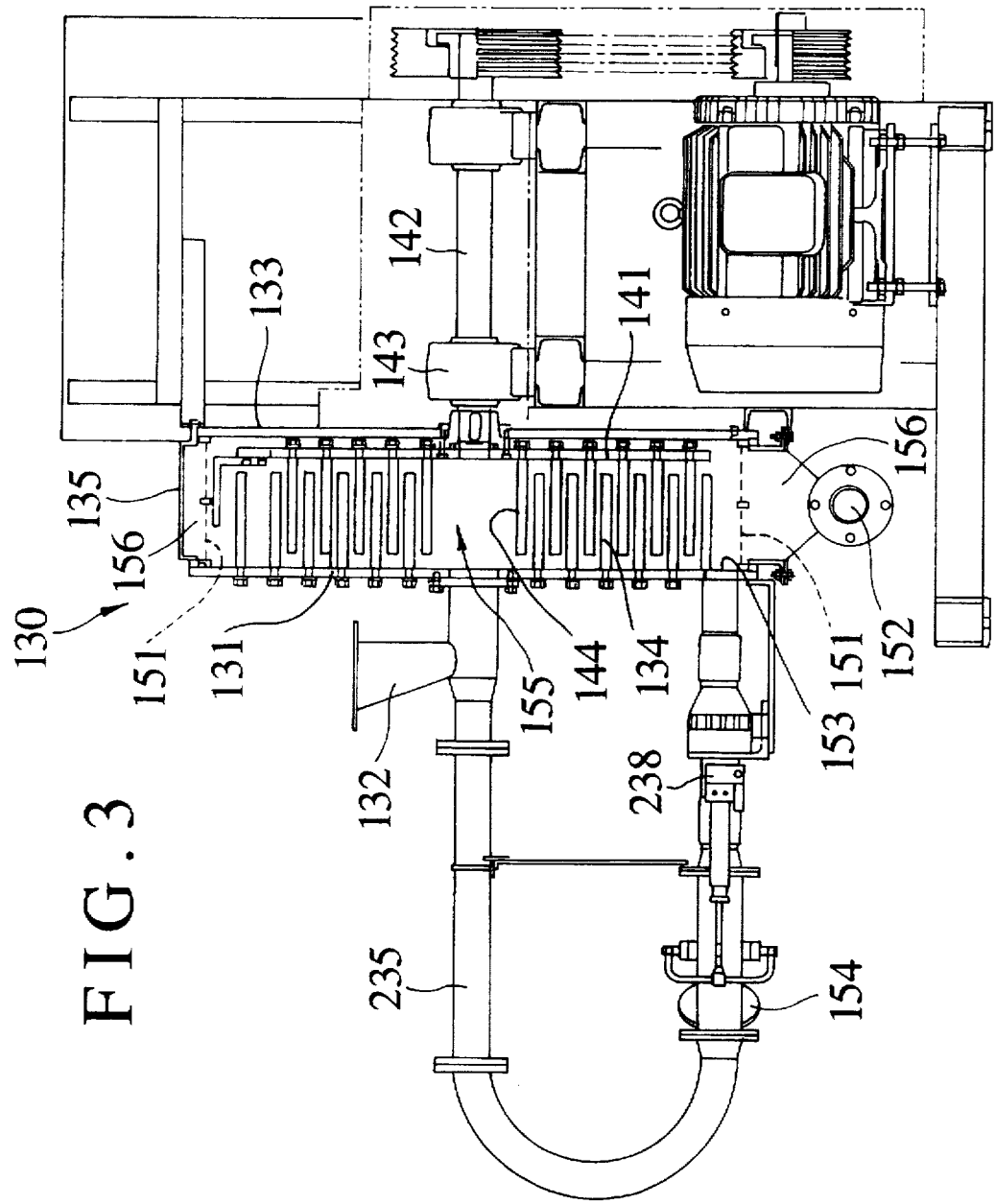
FIG. 3 is a fragmentary longitudinally sectioned view that provides a schematic representation of the general aspect of a polishing, granulating and size-regulating apparatus used in the separating, granulating and classifying step in the same example.
Figure 4:
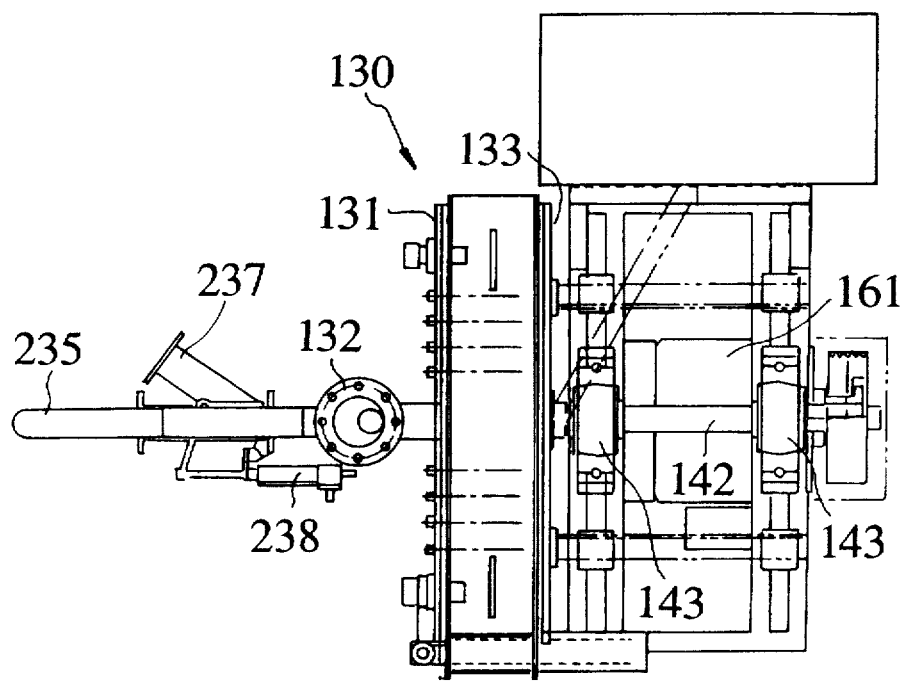
FIG. 4 is a plan view of FIG. 3.
Figure 5:
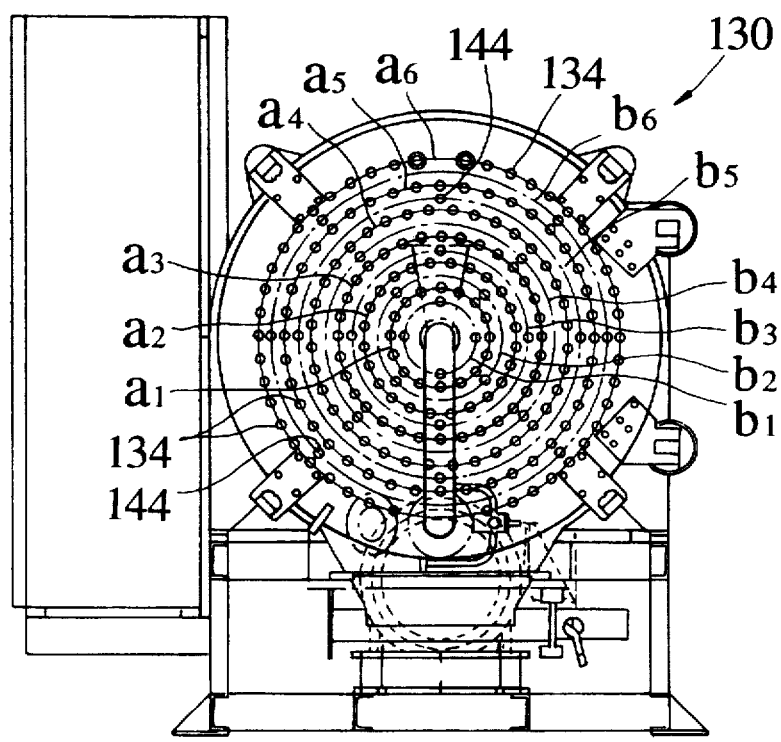
FIG. 5 is a front view for illustrating the polishing, granulating and size-regulating actions in FIG. 3.

Between the upper and lower screens 151, the removal port 153 is provided so as to be located at the lower part of the treating space 155 (FIG. 3). As shown in FIG. 7, it is possible that the blower 157 for the suction of air in the separator 130 is configured so as to be communicated with the removal port 153, in this case, through the means of this blower 157, communication to the inlet port 132 can be performed. Then, as shown in FIGS. 3 and 6, it is possible that the removal port 153 is configured so as to be communicated with the treating space 155 through the communicating pipe 235. In this case, through the pipe 236 for compressed air which is obtained from a compressed air supply source, although not illustrated, circulation from the removal port 153 to the treating space 155 can be performed and the particle-form materials 83 which has been discharged through the removal port 153 can be circulated again in the treating space 155 provided in the separator.

By the driving means to rotate, although not illustrated, the rotary shaft 142 is rotated so that the movable disc 141 can be rotated. Then, the small pieces 82 to be treated are fed through the inlet port 132. The small pieces 82 to be treated are located at the center portion of the treating space 155. Due to the impact type frictional crushing force generated between the fixed and movable pins 134, 144, a variety of resin materials composing the above-mentioned small pieces 82 to be treated are peeled or separated each other. Further, due to the friction heat generated between the movable pins and fixed pins, fusion of resin materials is not occurred. For example, the resin materials such as PP, PE, and ABS are granulated so as to have spherical shapes, the resin materials such as PET, PVC are granulated so as to have flaky or flake shapes. On the other hand, in the case of the foamed resin made from PUR, PP and the like, they are not granulated so as to have spherical, flaky, or flake shapes, but are pulverized so as to be powders due to the impact type frictional crushing force between the fixed and movable pins 134, 144.

In this way, the resin materials composing the small pieces 82 to be treated are peeled or separated, granulated, size-regulated or pulverized, by centrifugal force due to the rotation of the movable disc 141 and by air flow due to the suction of the blower 157 and the compressed air supplied into the treating space 155 through the means of pipe 236, pulverized powders 84 of the foamed resin and the particle-form materials 83 are gradually approached to the periphery-side. Then, after the powders 84 of the above-mentioned foamed resin are passed through the screens 151 and classified so as to entered into the discharge space 156, the powders 84 are sucked through the discharge port 152 and removed through the blower 157 for the recovery in the recovery tank 250.

When the recovery of the above-mentioned powders 84 of foamed resin is finished, the removal port 153 is communicated with the treating space 155 as desired through the means of communicating pipe 235 so that the particle-form materials are circulated again in the treating space 155. By doing this, the particle-form materials are granulated or size-regulated so as to have particle size of 2 to 4 mm. then, the granulated or size-regulated particle-form materials 83 are discharged through the removal port 153.

To the inlet port-side of the communicating pipe 235, which communicates the removal port 153 and the inlet port 132, the pipe 236 is communicated from the compressed air supply source, although not illustrated, for delivering the compressed air from the removal port 153-side to the inlet port 132-side. The above-mentioned communicating pipe 235 branches off at its inlet port-side so as to be the branch pipe 237 which is communicated to the recovery tank 240 for the particle-form materials. Then, on the diverging point of the branch pipe 237, for example the two way solenoid operated valve 238, which can be switched with a predetermined interval by utilizing a timer circuit, is provided. The downstream-side of the above-mentioned communicating pipe 235 is closed by the solenoid operated valve, at the same time, the branch pipe 237-side is opened. By this operation, the particle-form materials 83 which are remained within the screens 151 can be removed and recovered in the recovery tank 240 through the branch pipe 237. Alternatively, the solenoid operated valve which opens and closes the above-mentioned branch pipe 237 and the solenoid operated valve which opens and closes the downstream-side of the above-mentioned communicating pipe 235 are provided so that these two solenoid operated valves are opened and closed alternately (FIG. 6). In FIG. 3, the communicating pipe 235 is connected to the branch pipe 237 by means of the flange 154 which is provided on the pipe branched off from the upstream-side; removal port 153-side of the communicating pipe 235 (in the backward direction in the drawing of FIG. 3).

The compressed air supplied from the above-mentioned pipe 236 may be hot blast so that the above-mentioned small pieces 82 to be treated can be heated, granulated or size-regulated in short time.

The separator 130 configured in the above-mentioned manner is applied to the following experiment. First, a car's panel was crushed and coarsely crushed into the 6 kg of small pieces 82 to be treated each of which is composed by PP, foamed structure of PP, and PVC with the weight ratio of 50:5:45. Next, 6 kg of the small pieces 82 was fed into the separator 130 and the above-mentioned movable disc 141 was rotated with the rotation speed of 1250 rpm, 60 Hz. Then, the small pieces 82 to be treated were circulated for about 3 minutes. Finally, 3 kg of particle-form materials which had been granulated so as to have spherical shape (those may also hereinafter be referred to as the ("spherical particles"), 2.7 kg of mixture of particle-form materials of PVC which had been granulated so as to be flaky or flake shape (that may also hereinafter be referred to as the "flake particles") and 300 g of powders 84 of foamed structure resin of PP could be recovered.

Screening step

On that time, the particle-form materials composed by the above-mentioned PP spherical particles and PVC flake particles were preferably classified by screening with the mesh of 2 to 2.5 mm. By the above-mentioned screening, the materials could be classified to oversize and undersize with the ratio of about 80:20.

Selecting step

In this step, the particle-form materials 83 which have been recovered from the above-mentioned separating, granulating and classifying step are further selected and recovered with classification in terms of type, on the basis of particle-situations, in other words, properties showing a variety of friction resistance depending on the particle-situations. This step may be carried out as the previous step of the gravity selecting step. However, as for some kinds of particle-form materials, the rolling selecting step 1 and the rolling selecting step 2 mentioned below are not required for selecting and recovering a variety of resin materials and the materials can be selected and recovered in only the gravity selecting step.

Rolling selecting step 1

The rolling selecting step 1 can be substituted for the selecting step explained below: rolling selecting step 2. Alternatively, the rolling selecting step 1 can be carried out after the rolling step 2. Further, the both selecting steps: rolling steps 1, 2 can be carried out repeatedly. This rolling selecting step 1 is preferably applied to the above-mentioned about 80% of particle-form materials 83 left on the oversize-side.

The rolling selecting means for conducting the above-mentioned rolling selecting step is defined by the rolling selector 30 shown in FIG. 9. The rolling selector 30 includes the selecting base 32 which is surrounded by the wall 36 and whose bottom surface was formed by an endless belt 34. Since this endless belt 34 is configured to be rotatable by the rotation of roller 38, which is rotated with the driving source such as motor, the bottom surface of the above mentioned selecting base 32 can be moved rotatably in the directions indicated by arrow (dotted line) in FIG. 9 (C). The above-mentioned selecting base 32 is rotated from the lower side to the upper side of the slope and is provided with the belt by which the above-mentioned particle-form materials can be moved and the slope which is inclined from one side surface to another side surface on the transversely crossed section with respect to the rotating direction of the above-mentioned belt. As shown in FIG. 9 (A), when viewed from the front of the rolling selector 30, the selecting base is inclined to the right-side so as to form the angle of about 10° (degree) while as shown in FIG. 9 (B), when viewed from the right side surface of the rolling selector 30, the selecting base is inclined to the right-side so as to form the angle of about 5°. That is to say, the selecting base is inclined in two directions. In other words, the selecting base 32 is totally inclined in two directions, which are perpendicular each other, toward the corner R of the selecting base 32.

On the selecting base 32 which is configured in this way, the above-mentioned granulated or size-regulated particle-form materials 83a are gradually fed from the hopper 37 located above a slope at the corner R-side. Then, the above-mentioned endless belt 34 is rotated by means of the driving source through the roller 38. Thus, the particle-form materials 83a loaded on the above-mentioned endless belt 34 are moved according to the rotation of the endless belt 34. In this situation, due to the inclining of the above-mentioned selecting base 32, the above-mentioned particle-form materials 83a are moved upwardly in the inclining direction of the above-mentioned selecting base 32 while the spherical particles 83a of PP are moved so as to be distorted to the lower side, for instance, toward the corner R.

On the other hand, among the above-mentioned particle-form materials 83, the flake particles 83b of PVC are moved together with the endless belt 34 so as to be distorted to the upper side on the inclining direction of the selecting base 32 when viewed from front. Thus, the particle-form materials can be selected while the flake particles 83b are distorted to the upper part of the slope and the spherical particles 83a are distorted to the lower part of the slope with respect to the line X—X of FIG. 9 (C). That is to say, the particle-form materials 83 are moved to the upper side in the inclining direction when viewed in FIG. 9 (B), while the stream of materials is diverged into two streams with such distortion in terms of type. Finally, PVC and PP are selected so as to be recovered through the chute 31, 33, respectively.

Around the line X—X which divides vertically the above-mentioned selecting base into two sections, the above-mentioned spherical particles 83a and flake particles 83b are mixed. However, this mixture of particles is recovered separately and can be used as extender in producing molded articles. Alternatively, only this mixture of particles around here is recovered and subject to the rolling selecting step 1 repeatedly, or subject to the next step; the rolling selecting step 2 several times determined optionally for re-selecting.

Selecting step: Rolling selecting step 2

FIG. 10 shows the vibration selector 40 as other selecting means; rolling selecting means. This rolling selecting step 2 is desirable to be applied to the particle-form materials 83 which contains a mixture of the above mentioned spherical particles 83a and flake particles 83b, particularly, to the above-mentioned about 20% of particle-form materials 83 left on the undersize-side. The above-mentioned vibration selector 40 includes the hopper 46, which is mounted on the base frame, and the selecting base 41, which selects, with classification in terms of particle-situation, the particle-form thermoplastic resin materials 83 discharged downwardly from the hopper 46. The selecting base 41 is provided with the walls 43 so as to be placed transversely. When viewed from the front in FIG. 10 (A), the selecting base 41 is inclined to the left-side of this drawing, similarly, when viewed from the front in FIG. 10 (B), the selecting base 41 is inclined to the left-side of this drawing, thus, it is inclined in the two directions. In this situation, all of the spherical substances are moved downwardly to the lower side in the drawing of FIG. 10 (C). The surface of the above-mentioned selecting base 41 is formed to be rough like a sand paper for obtaining relatively high friction resistance. Further, the vibration motor 42 as vibration generating means is provided, through the springs 44, on the base so that the selecting base 41 can be vibrated in the vertical direction on the drawing of FIG. 10 (C) with, for example, at the amplitude of 1 mm and the vibration speed of 3000 times/minute. By such vibration, the spherical particles 83a are led to the lower side of FIG. 10 (C), while the flake particles 83b are led to the upper side of the same figure. Thus, the particles are moved downwardly while the stream of the particles is diverged into two streams with such distortion in terms of type.

In the same figure, the reference numeral 47, 48 designate adjusting handles for the above-mentioned inclining angle. The reference numeral 49 is a sorting plate, which is fixed to the chute 50 defined by a plane plate. Then, the sorting plate 49 is arranged so as to be V-shaped and enlarged in inclining direction for removing, in different directions, the materials 83, which have been selected by means of the above-mentioned selecting base 41. As for the above mentioned rolling selecting steps 1 and 2, either step may be carried out. Alternatively, for example when, although the spherical particles 83 are granulated or size-regulated so as to have particle situation of flake particle 83b or spherical particle 83a, the diameters or areas of the particles are not constant, both of the rolling selecting steps are carried out for efficient selecting. In this case, it is preferable that the rolling selecting step 1 is carried out before the step 2 is carried out.

Selecting step: gravity selecting step

This step is performed, for the particle-form materials 83 which have been subject to the separating, granulating, size-regulating, and classifying step, after the above-mentioned rolling selecting step. The purpose of this step is to recover more purified particle-form thermoplastic resin materials. Another purpose of this step is as follows. As for some molded articles, even if they are frictionally crushed by the separator, the resultant each particle is not a spherical particle but has a sort of plane shape of circle. Such materials may be contaminated in the vibration selecting step. Additionally, if there are thermoplastic resin materials having too small diameters, regardless to whether they have suitable particle-situation or not, they can not be selected in the rolling selecting step. The above-mentioned contaminated materials as those having different types can be recovered by applying this gravity selecting step. Precisely, in this gravity selecting step, for the substance where the thermoplastic resin materials are mixed such as ABS and PVC, PP and PVC, PP and PET, and the like (the substance is referred as "mixture" in FIG. 1), due to small difference in their specific gravity; equal to or larger than 0.2, they can be selected with classification in terms of type.

As the mixture of a variety types of materials, the particle-form materials 83, which have been subject to the above-mentioned selecting steps; rolling selecting step 1 and/or 2, the rolling selecting step by means of the rolling selector 30 (and/or 40), are fed into water contained in a vessel with an agitator. In this vessel, layer-peeling or separating is performed for selecting the particle-form materials with classification in terms of specific gravity.

Figure 11:
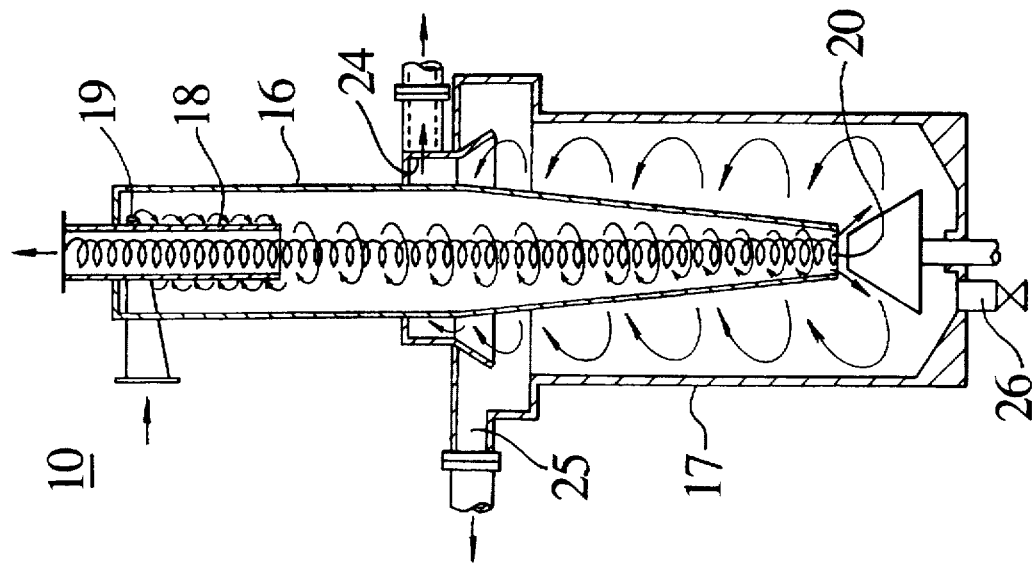
FIG. 11 is a total view that provides a representation of the main part of selecting means used in an example of the gravity selecting step of the present invention.

Exemplified means for conducing the above-mentioned step, the cyclone 10 is shown in FIG. 11. Into the cyclone 10, as a liquid to be treated, the mixture of 20 t/h of water and 150 kg/h of materials, which have been subject to the above-mentioned separating, granulating, and classifying step or rolling selecting step, is fed with pressure through the injecting hole 19. This feeding causes a vortex down flow along the peripheral wall of the upper cyclone 16. Due to this vortex flow, among the variety types of particle-form materials 83, the PET and PVC having large specific gravity are collected to the peripheral wall due to the centrifugal force so as to be flow downwardly together with the vortex flow and moved to the lower cyclone 17 as the vortex flow through the opening 20.

Then the PET and PVC moved upwardly along the peripheral wall are discharged through the discharge port 25. On the other hand, the PP and ABS having small specific gravity are collected to the vacuum central core generated by the vortex flow in the upper cyclone 16 so as to be discharged through the discharge tube 18. The reference numeral 24 designates the liquid discharge port. The reference numeral 26 designates the removal port for removing deposit collected at the bottom of the lower cyclone.

In the above-mentioned explanation, the materials, which are commonly applied to the car's inner and outer equipment, such as ABS, PVC, PP, PET, are used as general examples. However, other molded articles or other thermoplastic resin materials such as polyethylene (PE), polycarbonate (PC) can be treated in the similar way so as to be recovered as the size-regulated particle-form thermoplastic resin materials.

The particle-form materials 83 obtained in the present invention can be fed directly into a molding apparatus such as an extruder for obtaining other molded articles such as polyester fiber, polyester cotton or pellets which can be used as the raw materials for molding the thermoplastic resin materials. Further, by kneading the recovered thermoplastic resin materials and virgin thermoplastic resin materials which have same quality as the recovered materials, for example, in the case of PVC, by kneading with the virgin hard PVC, pellets can be obtained as well as the obtained pellets can be used for molding other molded articles. Additionally, the pellets kneaded with dried wood flour are fed into the extruder for molding plywood.

Now, is explained closely an example of regenerating process for disposed molded articles by utilizing the above-mentioned process and apparatus of the present invention.

EXAMPLE 1

Disposed thermoplastic molded resin articles to be treated: Car's panel

| layer | surface layer | intermediate layer | substrate material layer |
|---|---|---|---|
| resin material | PVC | urethane (foamed structure) | ABS |
| composition-ratio (wt %) | 45 | 7 | 48 |

Type and composition-ratio of thermoplastic resin material composing the disposed thermoplastic molded resin articles to be treated 50 kg of disposed car's panel composed by the above thermoplastic resin materials was crushed into the pieces of 50 mm×50 mm in size by means of a crusher. Then, the pieces were passed through a screen having the diameter of 4 mm provided in a cutter mill so as to be small pieces to be treated. In a separator rotating at the rotating speed of 1,190 rpm, 56 Hz, impact type frictional crushing force was applied to the small pieces for about 3 minutes for separating, granulation and classifying.

As a result, 46.5 kg of particle-form materials containing a mixture of spherical particles and flake particles and 3.5 kg of powders of foamed resin of PUR were obtained by classifying. Since the above foamed resin of PUR was obtained in the form of powder, if it is mixed with PP so as to be molded, it is preferably applied to building material such as form work material, roof ground material.

20 kg of particle-form resin material recovered in this way was selected by means of a rolling selector, thus, 10.3 kg of ABS granulated or size-regulated so as to be spherical particles and 9.7 kg of PVC granulated or size-regulated so as to be flaky or flake particles were obtained.

The above ABS and PVC were highly purified of about 99% and 98% in purity, respectively. As a result, the disposed molded resin articles could be almost completely recovered in raw-form with classification in terms of type. These recovered ABS and PVC could be used as raw materials for producing a variety of molded articles, like virgin ABS and PVC.

EXAMPLE 2

Disposed thermoplastic molded resin articles to be treated: Car's panel

| layer | surface layer | intermediate layer | substrate material layer |
|---|---|---|---|
| Type and composition-ratio of thermoplastic resin material composing the disposed thermoplastic molded resin articles to be treated (A) | | | |
| resin material | PVC | urethane (foamed structure) | PP |
| composition-ratio (wt %) | about 33 | about 7 | about 60 |
| Type and composition-ratio of thermoplastic resin material composing the disposedthermoplastic molded resin articles to be treated (B) | | | |
| resin material | PVC | urethane (foamed structure) | ABS |
| composition-ratio (wt %) | about 45 | about 7 | about 48 |

Molded articles to be treated was prepared by mixing two types of car's panels (A), (B) produced by two makers respectively with the mix ratio of 100:100. Then, 10 kg of the molded articles were crushed into pieces each of 50 mm×150 mm in size by means of a crusher. Next, the pieces were passed through a screen having the diameter of 4 mm provided in a cutter mill so as to be small pieces to be treated. With a separator rotating at the rotating speed of 1,190 rpm, 56 Hz, the small pieces were subject to separating, granulation and classifying for about 3 minutes.

As a result, 9.3 kg of particle-form materials containing a mixture of spherical particles and flake particles and 700 g of powders of foamed resin of PUR were obtained. Since the above foamed resin of PUR was obtained in the form of powder, it is preferably applied to reinforcing agent of molded articles and building material such as form work material, roof ground material.

9.3 kg of particle-form resin materials recovered in this way was subjected to screening. Then, particle-form materials left on the oversize-side and those left on the undersize-side were selected respectively by rolling selecting in the rolling selectors 1, 2. Thus, 5.4 kg of particle-form resin materials containing a mixture of particle-form materials of PP and particle-form materials of ABS granulated so as to be spherical and 3.9 kg of particle-form resin materials of PVC granulated so as to be flaky or flake.

The above particle-form resin materials of PVC were highly purified of about 98% in purity. These recovered PVC could be used as raw materials for producing a variety of molded articles, like virgin PVC.

Further, 5.4 kg of particle-form materials containing a mixture of spherical particles of PP and particle-form of ABS selected by the above-mentioned rolling selector was gravity selected. Thus, the particle-form resin materials of PP and the particle-form resin materials of ABS were selected so that 3.0 kg of particle-form resin materials of PP and 2.4 kg of particle-form resin materials of ABS were obtained.

The above obtained particle-form materials of PP and those of ABS were highly purified of about 99% and 98% in purity, respectively. As a result, the disposed molded resin articles could be almost completely recovered in raw-form with classification in terms of type. These recovered PP and ABS could be used as raw materials for producing a variety of molded articles, like virgin PP and ABS.

If, the disposed molded resin articles to be treated (A), (B) are sorted before subjecting to the rolling selecting step, this gravity selecting step is not required.

In order to separate and select PP film, PVC film and the like, a blower equipped with a cyclone such as suction type pneumatic selector having process capacity of 200 to 500 kg/hr, although not illustrated, can be applied. In this case, the PP film and the PVC film are sucked and subject to pneumatic selecting with classification in terms of weight.

By the present invention, in the relatively simple and easy means, with only the impact type frictional crushing force, from the disposed molded articles composed by a variety of laminating materials, the adhesive can be peeled and separated so that the thermoplastic resin materials can be efficiently granulated and recovered in raw-form of thermoplastic resin materials, which are granulated and size-regulated within the predetermined range of particle size, for reuse thereof.

Conventionally, it was difficult to reuse the disposed molded articles containing a variety of laminating materials such as molded article having the multi-layer structure. However, the present invention enables such reuse and efficient reuse of sources can be attained.

Thus, the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

Now that the invention has been described;
What is claimed is:
1. A process for regenerating laminated thermoplastic molded resin articles comprising:
coarsely crushing thermoplastic molded resin articles composed of a variety of laminating thermoplastic resin materials into a plurality of small pieces to be treated;
applying an impact type frictional crushing force to the coarsely crushed small pieces to be treated so that said thermoplastic resin materials are peeled or separated and granulated or size-regulated with classification in terms of type to obtain particle-form thermoplastic resin materials;
selecting said particle-form thermoplastic resin materials with classification in terms of
(i) specific gravity of each thermoplastic resin material composing said particle-form thermoplastic resin materials and/or
(ii) particle-situation thereof, and
recovering according to this selecting action, particle-form thermoplastic resin materials in raw-form with classification in terms of type.
2. A process according to claim 1, wherein said articles to be treated are laminated thermoplastic molded resin articles used for a car's inner and outer equipment, and wherein selecting said particle-form thermoplastic resin is accomplished by a rolling selecting step by means of (i) a selecting base which is inclined in two directions from lower side to upper side and rotated or (ii) a selecting base which is inclined in two directions from upper side to lower side and vibrated in a direction crossing with respect to the inclining direction thereof, where said particle-form thermoplastic resin materials are moved while their stream is diverged into two streams with distortion on said selecting base so that said thermoplastic resin materials can be selected with classification in terms of particle-situation.

3. A process according to claim 2, wherein selecting said particle-form thermoplastic resin additionally comprises a gravity selecting step where a variety of particle-form thermoplastic resin materials in mixture-form are selected with classification in terms of difference in specific gravity.

4. A process according to claim 1, which additionally comprises screening said particle-form thermoplastic resin material to separate oversize and undersize particles and where selecting oversize particle-form thermoplastic resin is accomplished by a rolling selecting step by means of a selecting base which is rotated from lower side to upper side, and wherein the oversize particles of thermoplastic resin material are moved while their stream is diverged into two streams with distortion on said selecting base so that said oversize particles of thermoplastic resin material can be selected with classification in terms of particle-situation, and selecting undersize particle form thermoplastic resin is accomplished by a rolling selecting step by means of a selecting base which is vibrated in a direction crossing with respect to the inclining direction thereof and wherein the undersize, particles of thermoplastic resin material are moved while their stream is diverged into two streams with distortion on said selecting base so that said undersize particles of thermoplastic resin materials can be selected with classification in terms of particle-situation.

5. A process according to claim 4, which additionally comprises screening said particle-form thermoplastic resin material to separate oversize and undersize particles and wherein selecting oversize particle-form thermoplastic resin is accomplished by a rolling selection step by means of a selecting base which is rotated from lower side to upper side, and wherein the oversize particles of thermoplastic resin materials are moved while their stream is diverged into two streams with distortion on said selecting base so that said oversize thermoplastic resin material can be selected with classification in terms of particle-situation, and selecting undersize particle form thermoplastic resin is accomplished by a rolling selecting step by means of a selecting base which is vibrated in a direction crossing with respect to the inclining direction thereof, and wherein the undersize particles of thermoplastic resin material are moved while their stream is diverged into two streams with distortion on said selecting base so that said undersize particles of thermoplastic resin materials can be selected with classification in terms of particle-situation.

6. A process according to claim 5, wherein selecting said particle-form thermoplastic resin additionally comprises a gravity selecting step where a variety of particle-form thermoplastic resin materials in mixture-form are selected with classification in terms of difference in specific gravity.

7. A process according to claim 4, wherein selecting said particle-form thermoplastic resin additionally comprises a gravity selecting step where a variety of particle-form thermoplastic resin materials in mixture-form are selected with classification in terms of difference in specific gravity.

8. An apparatus for regenerating laminated thermoplastic molded resin articles comprising:

coarsely crushing means for thermoplastic molded resin articles composed of a variety of laminating thermoplastic resin materials, which coarsely crushes said thermoplastic molded resin articles into a plurality of small pieces to be treated;

separating, granulating and classifying means which provide impact type frictional crushing force between a series of fixed pins and a series of movable pins which are rotated relatively in a plurality of rotational orbits, respectively, being different from each other, from which thermoplastic resin materials composing said small pieces to be treated are peeled or separated, with classification in terms of type, as well as granulated or size-regulated alternatively granulated, size-regulated and pulverized to obtain particle-form thermoplastic resin materials; and selecting means by which said particle-form thermoplastic resin materials, which have been granulated or size-regulated by said separating, granulizing, and classifying means, are selected with classification in terms of specific gravity or particle-situation or particle situation and specific gravity, and particle-form thermoplastic resin materials are recovered in raw-form with classification in terms of type according to this selecting action.

9. An apparatus according to claim 8, wherein said articles to be treated are laminated thermoplastic molded resin articles used for a car's inner and outer equipment, and said selecting means comprising rolling selecting means where selecting action is carried out with classification in terms of particle-situation of said particle-form thermoplastic resin materials and gravity selecting means where selecting action is carried out with classification in terms of difference in specific gravity of said particle-form thermoplastic resin materials.

10. An apparatus according to claim 9, wherein, said rolling selecting means comprises a belt, which is rotated from lower side to upper side of a slope and can transform said particle-form thermoplastic resin materials, and said slope is inclined in two directions from one side surface to another side surface on transversely crossed section with respect to rotating direction of said belt.

11. The regenerating apparatus of laminated thermoplastic molded resin articles according to claim 9, said crushing means comprises crushers which are arranged so as to be located in upper and lower levels respectively and said upper crusher has an axis which is located horizontally while said lower crusher has an axis which is inclined so as to have the angle of 45°.

12. The regenerating apparatus of laminated thermoplastic molded resin articles according to claim 9, wherein said selecting base has a surface, which is inclined in two directions and rough so as to have high friction resistance, and vibration generating means, which vibrates with a predetermined amplitude on a defined direction.

13. An apparatus according to claim 8, said crushing means comprises crushers which are arranged so as to be located in upper and lower levels respectively and said upper crusher has an axis which is located horizontally while said lower crusher has an axis which is inclined so as to have the angle of 45°.

14. An apparatus according to claim 8, comprising fixed-side separating, granulating and classifying means which is provided on a fixed disc having a center portion communicated with an inlet port for said small pieces to be treated and which includes said series of fixed pins set in said plurality of rotational orbits;

movable-side separating, granulating and classifying means which is provided on a movable disc located oppositely with respect to said fixed disc so as to be driven to rotate and which includes said series of movable pins set in said plurality of rotational orbits different from those for said fixed pins; classifying means which is located on the external periphery surrounding combination of said fixed pins and said movable pins and communicated with an discharge port for excharging thermoplastic resin materials and removing means which removes and passes to a removal port, granulated or size-regulated particle-form thermoplastic resin materials each of which has a desired particle size; and separating, granulating and classifying means by which, due to impact type frictional crushing force, between said fixed pins and said movable pins, thermoplastic resin materials composing said small pieces to be treated are peeled or separated with classification in terms of type, as well as granulated, size-regulated or granulated, size-regulated and pulverized so that said resultant granulated, size-regulated or granulated, size-regulated and pulverized thermoplastic resin materials can be classified; and wherein a pipe is communicated from a compressed air supply source to the removal port-side of a communicating pipe, which is communicated between said removal port and said inlet port, and said communicating pipe branches off at the inlet port-side so as to be a branch pipe, which is communicated to a recovery tank of particle-form thermoplastic resin materials and which is provided with a three way solenoid operated valve on its diverging point.

15. The regenerating apparatus of laminated thermoplastic molded resin articles according to claim 8, wherein said selecting base has a surface, which is inclined in two directions and rough so as to have high friction resistance, and vibration generating means, which vibrates with a predetermined amplitude on a defined direction.

* * * * *